(12) United States Patent
Halonen

(10) Patent No.: US 7,577,439 B2
(45) Date of Patent: Aug. 18, 2009

(54) METHOD OF CONTROLLING TRAFFIC, RADIO SYSTEM, REMOTE UNIT AND BASE STATION

(75) Inventor: Harri Halonen, Jääli (FI)

(73) Assignee: Nokia Corporation, Espoo (FI)

( * ) Notice: Subject to any disclaimer, the term of this patent is extended or adjusted under 35 U.S.C. 154(b) by 417 days.

(21) Appl. No.: 11/246,260

(22) Filed: Oct. 11, 2005

(65) Prior Publication Data

US 2006/0199595 A1  Sep. 7, 2006

(30) Foreign Application Priority Data

Mar. 4, 2005  (FI) .................................. 20055105

(51) Int. Cl.
*H04Q 7/20* (2006.01)
*H04Q 7/00* (2006.01)

(52) U.S. Cl. .................. 455/453; 455/436; 455/422.1; 455/423; 455/67.11; 455/403; 370/331; 370/315; 370/332; 370/333

(58) Field of Classification Search .................. 455/453, 455/423, 450, 67.11, 67.13, 67.14, 436, 11.1, 455/13.4, 403, 422.1, 561
See application file for complete search history.

(56) References Cited

U.S. PATENT DOCUMENTS

| 5,901,341 | A | * | 5/1999 | Moon et al. ..................... 455/9 |
| 6,160,992 | A | * | 12/2000 | Laham et al. ............... 455/11.1 |
| 6,374,124 | B1 | * | 4/2002 | Slabinski ................. 455/562.1 |
| 6,480,468 | B1 | * | 11/2002 | Kishigami et al. ........ 370/230.1 |
| 6,560,442 | B1 | | 5/2003 | Yost |
| 7,139,527 | B2 | * | 11/2006 | Tamaki et al. .................. 455/16 |
| 2001/0031624 | A1 | * | 10/2001 | Schmutz ..................... 455/13.4 |
| 2002/0028675 | A1 | * | 3/2002 | Schmutz et al. ............. 455/424 |
| 2002/0150063 | A1 | | 10/2002 | Tran |
| 2003/0036408 | A1 | * | 2/2003 | Johansson et al. ........... 455/560 |
| 2003/0153315 | A1 | * | 8/2003 | Gunreben et al. ........... 455/445 |
| 2004/0180659 | A1 | * | 9/2004 | Pedraza et al. .............. 455/436 |
| 2004/0209582 | A1 | * | 10/2004 | Liu et al. ..................... 455/136 |
| 2004/0266338 | A1 | * | 12/2004 | Rowitch ........................ 455/7 |
| 2005/0064872 | A1 | * | 3/2005 | Osseiran et al. .......... 455/452.1 |
| 2005/0208950 | A1 | * | 9/2005 | Hasse ......................... 455/453 |

FOREIGN PATENT DOCUMENTS

WO  WO 2005/004514 A1  1/2005

* cited by examiner

*Primary Examiner*—Huy Q Phan
(74) *Attorney, Agent, or Firm*—Squire, Sanders & Dempsey L.L.P.

(57) ABSTRACT

A radio system includes one or more remote units in each cell coverage area controlled by a base station. The remote units communicate with one or more terminals of the radio system. The remote units are configured to detect traffic parameters of one or more terminal signals within the coverage area of each remote unit. The base station is configured to receive the signals related to the detected traffic parameters from the remote units. The base station also is configured to calculate relative average traffic levels between the remote units on the basis of the received signals related to the traffic parameters from the remote units, and to allocate traffic transfer resources in the radio system on the basis of the calculated relative average traffic levels between the remote units.

26 Claims, 3 Drawing Sheets

METHOD OF CONTROLLING TRAFFIC, RADIO SYSTEM, REMOTE UNIT AND BASE STATION

FIELD

The invention relates to a method of controlling traffic in a radio system, to a radio system, to a remote unit and to a base station.

BACKGROUND

For example, for WCDMA (Wideband Code Division Multiple Access) radio systems different indoor systems are being developed. Such new services provided by operators require high-speed data capabilities. The costs of the initial investments for these indoor systems and propagation losses through walls are forcing the operators to use distributed antenna solutions. However, to enable a fast reaction to the possible growth of the traffic in the indoor networks, adding capacity must be easy and flexible. Thus, point-to-point connections in the active antenna elements may be used. Initially there can be, for example, 16 active antenna elements for one cell. When the traffic is growing the operator will increase the capacity by splitting a cell into two cells. However, in order to make sure that the traffic is also splitted into half, information on how the traffic is distributed between the remote units is needed. Without this information the splitting of a cell into two cells may result in having one cell with minimum traffic and another cell that still may have some blocking for calls.

Thus, there is a need for traffic monitoring and control in different radio systems in order to allocate traffic transfer resources in the radio system more efficiently. However, a cell traffic measurement is not enough because it will only tell the total traffic from all the remote units in the same cell. Also, methods of splitting cells so that the traffic is evenly shared between new cells are needed.

BRIEF DESCRIPTION OF THE INVENTION

An object of the invention is to provide an improved method of controlling traffic in a radio system, an improved radio system, an improved remote unit and an improved base station.

According to an aspect of the invention, there is provided a method of controlling traffic in a radio system, the radio system comprising one or more remote units in each cell coverage area controlled by a base station, the remote units communicating with one or more terminals of the radio system. The method comprises detecting, by the remote units, traffic parameters of one or more terminal signals within the coverage area of each remote unit; receiving, in the base station, signals related to the detected traffic parameters from the remote units; calculating, by the base station, relative average traffic levels between the remote units on the basis of the received signals related to the traffic parameters from the remote units; and allocating traffic transfer resources in the radio system on the basis of the calculated relative average traffic levels between the remote units.

According to another aspect of the invention, there is provided a radio system, comprising one or more remote units in each cell coverage area controlled by a base station, the remote units communicating with one or more terminals of the radio system. The remote units are configured to detect traffic parameters of one or more terminal signals within the coverage area of each remote unit; the base station is configured to receive signals related to the detected traffic parameters from the remote units, to calculate relative average traffic levels between the remote units on the basis of the received signals related to the traffic parameters from the remote units, and to allocate traffic transfer resources in the radio system on the basis of the calculated relative average traffic levels between the remote units.

According to another aspect of the invention, there is provided a remote unit for a radio system, the remote unit comprising a processing unit for controlling the functions of the remote unit, a detection unit, and a communication unit for communicating with one or more terminals and with a base station. The detection unit is configured to detect traffic parameters of one or more terminal signals within the coverage area of each remote unit, and the communication unit is configured to send a signal related to the detected traffic parameters to the base station for enabling the base station to calculate relative average traffic levels between all the remote units within the coverage area of the base station on the basis of the received signals related to the traffic parameters from the remote units, and to allocate traffic transfer resources in the radio system on the basis of the calculated relative average traffic levels between the remote units.

According to another aspect of the invention, there is provided a base station for a radio system, the base station comprising a processing unit for controlling the functions of the base station, and a communication unit for communicating with one or more remote units in each cell coverage area controlled by the base station. The communication unit is configured to receive, from the remote units, signals related to traffic parameters of one or more terminal signals within the coverage area of each remote unit; and the processing unit is configured to calculate relative average traffic levels between the remote units on the basis of the received signals related to the traffic parameters from the remote units, and to allocate traffic transfer resources in the radio system on the basis of the calculated relative average traffic levels between the remote units.

According to yet another aspect of the invention, there is provided a radio system, comprising one or more remote units in each cell coverage area controlled by a base station, the remote units communicating with one or more terminals of the radio system. The remote units further comprise detection means for detecting traffic parameters of one or more terminal signals within the coverage area of each remote unit; the base station comprises receiving means for receiving signals related to the detected traffic parameters from the remote units, calculation means for calculating relative average traffic levels between the remote units on the basis of the received signals related to the traffic parameters from the remote units, and allocation means for allocating traffic transfer resources in the radio system on the basis of the calculated relative average traffic levels between the remote units.

The invention provides several advantages. It is possible to detect how traffic is divided between different remote units of the radio system. Optimal allocation of traffic transfer resources is enabled. Thus, traffic load can be evenly shared between different cells.

LIST OF DRAWINGS

In the following, the invention will be described in greater detail with reference to the embodiments and the accompanying drawings, in which FIG. 1 a simplified block diagram illustrating the structure of a radio system;

DESCRIPTION OF EMBODIMENTS

Figure 1:
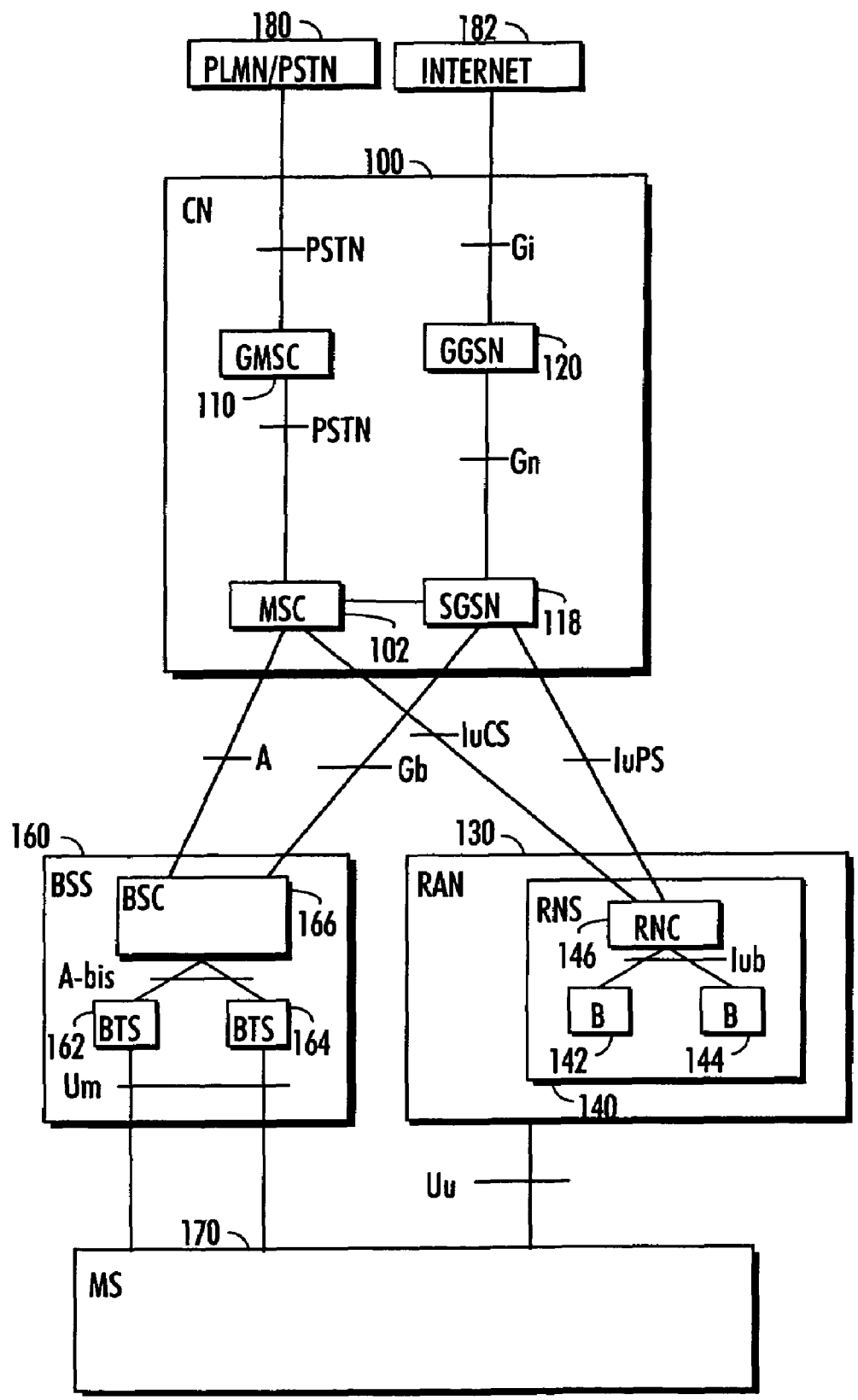

With reference to FIG. 1, let us examine an example of a radio system in which the preferred embodiments of the invention can be applied. The embodiments are, however, not restricted to these systems described by way of example, but a person skilled in the art can also apply the instructions to other radio systems containing corresponding characteristics. The embodiments of the invention may be implemented, for example, in advanced indoor/outdoor radio systems or in any distributed antenna systems where the antenna points can be measured separately.

FIG. 1 is a simplified block diagram, which shows the most important parts of a radio system and the interfaces between them at the network-element level. The main parts of a radio system are a core network (CN) 100, a radio access network 130 and user terminal 170. The radio access network 130 may be implemented by wideband code division multiple access (WCDMA) technology. The structure and functions of the network elements are not described in detail, because they are generally known.

Mobile services switching centre (MSC) 102 is a mobile network element that can be used to serve the connections of both a radio access network and a base station system 160. The tasks of the mobile services switching centre 102 include: switching, paging, user terminal location registration, handover management, collection of subscriber billing information, encryption parameter management, frequency allocation management, and echo cancellation. The number of mobile services switching centres 102 may vary: a small network operator may only have one mobile services switching centre 102, but in large core networks 100, there may be several.

Large core networks 100 may have a separate gateway mobile services switching centre (GMSC) 110, which takes care of circuit-switched connections between the core network 100 and external networks 180. The gate-way mobile services switching centre 110 is located between the mobile services switching centre 102 and the external networks 180. An external network 180 can be for instance a public land mobile network (PLMN) or a public switched telephone network (PSTN).

A serving GPRS support node (SGSN) 118 is the centre point of the packet-switched side of the core network 100. The main task of the serving GPRS support node 118 is to transmit and receive packets with a mobile station 170 supporting packet-switched transmission by using the base station system 160. The serving GPRS support node 118 contains subscriber and location information related to the user terminal 170.

A gateway GPRS support node (GGSN) 120 is the packet-switched side counterpart to the gateway mobile services switching centre of the circuit-switched side with the exception, however, that the gateway GPRS support node 120 is also capable of routing traffic from the core network 100 to external networks 182, whereas the gateway mobile services switching centre only routes incoming traffic. In our example, the Internet represents external networks 182.

The base station system 160 comprises a base station controller (BSC) 166 and base transceiver stations (BTS) 162, 164. The base station controller 166 controls the base transceiver station 162, 164. Oftentimes the devices implementing the radio path and their functions reside in the base transceiver station 162, 164, and control devices reside in the base station controller 166.

The base station controller 166 takes care of the following tasks, for instance: radio resource management of the base transceiver station 162, 164, intercell handovers, frequency control, i.e. frequency allocation to the base transceiver stations 162, 164, management of frequency hopping sequences, time delay measurement on the uplink, implementation of the operation and maintenance interface, and power control.

The base transceiver station 162, 164 contains at least one transceiver, which provides one carrier, i.e. eight time slots, i.e. eight physical channels. Typically, one base transceiver station 162, 164 serves one cell, but it is also possible to have a solution in which one base transceiver station 162, 164 serves several sectored cells. The tasks of the base transceiver station 162, 164 include: calculation of timing advance (TA), uplink measurements, channel coding, encryption, decryption, and frequency hopping.

The radio access network 130 is made up of radio network subsystems 140. Each radio network subsystem 140 is made up of radio network controllers 146 and B nodes 142, 144. A B node is a rather abstract concept, and often the term base station is used instead.

The user terminal 170 comprises at least one transceiver for establishing a radio link to the base station system 160. The user terminal 170 can contain different subscriber identity modules. In addition, the user terminal 170 contains an antenna, a user interface and a battery. Today, there are different types of user terminals 170, for instance equipment installed in cars and portable equipment. Features better known from personal or portable computers have also been implemented in the user terminal 170.

In UMTS, the most important interfaces are the Iu interface between the core network and the radio access network, which is divided into the interface IuCS on the circuit-switched side and the interface IuPS on the packet-switched side, and the Uu interface between the radio access network and the user equipment. In GSM/GPRS, the most important interfaces are the A interface between the base station controller and the mobile services switching center, the Gb interface between the base station controller and the serving GPRS support node, and the Um interface between the base transceiver station and the user terminal. The Um interface is the GPRS network interface for providing packet data services over the radio to the mobile station. The interface defines what kind of messages different network elements can use in communicating with each other.

Figure 2:
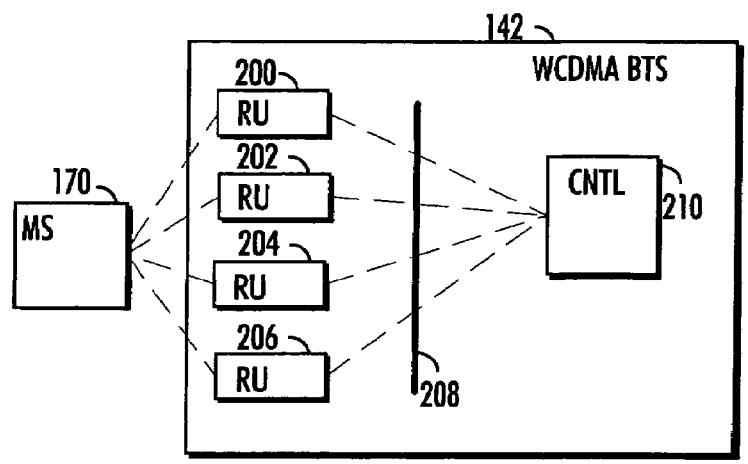
FIG. 2 illustrates an example of a WCDMA indoor radio system.

FIG. 2 illustrates another example of a radio system where embodiments of the invention can also be applied. The radio system of FIG. 2 is, for example, a WCDMA indoor radio system. The radio system of FIG. 2 comprises one or more remote units 200-206 in each cell coverage area controlled by a base station 142. The remote units 200-206 may communicate with one or more terminals 170 of the radio system. In FIG. 2, the one or more terminals are for simplicity's sake illustrated as a single block 170. An interface 208 between the remote units 200-206 and the base station 142 may be, for example, a fiber interface or an air interface. Because the embodiments of the invention may be implemented, for example, in distributed antenna systems where the antenna points can be measured separately, the remote units 200-206 can correspond to antenna points of a distributed antenna system.

In an embodiment, the remote units 200-206 are configured to detect traffic parameters of one or more terminal signals within the coverage area of each remote unit. The base station 142, controlled by a control unit 210, is configured to receive signals related to the detected traffic parameters from the remote units 200-206, to calculate relative average traffic levels between the remote units 200-206 on the basis of the received signals related to the traffic parameters from the remote units, and to allocate traffic transfer resources in the radio system on the basis of the calculated relative average traffic levels between the remote units 200-206.

Figure 3:
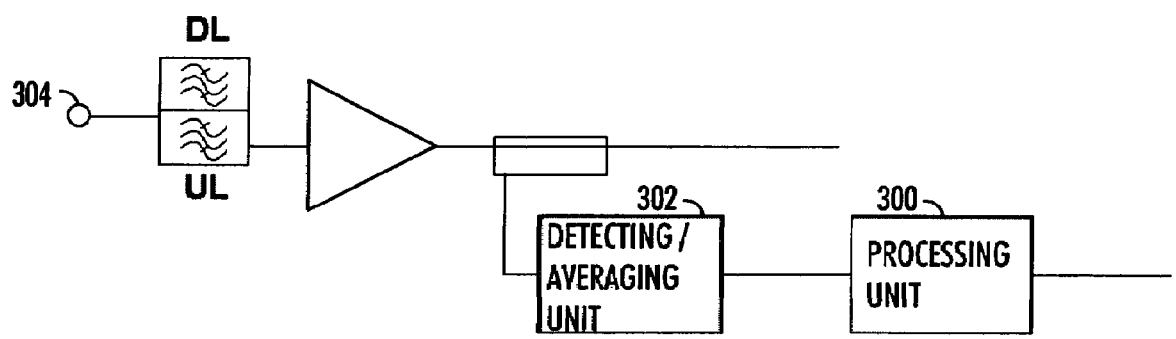
FIG. 3 shows an example of a remote unit of a radio system.

FIG. 3 shows a more detailed example of a remote unit of a radio system. The remote unit comprises a processing unit 300 for controlling the functions of the remote unit, a detection and averaging unit 302, and a communication unit 304 for communicating with one or more terminals and with a base station. Communication with the base station may occur through a wired connection. The communication unit 304 may comprise an antenna port feeding a single or multiple antenna networks (integrated or external antennas).

The detection units 302 of each remote unit are configured to detect traffic parameters of one or more terminal signals within the coverage area of each remote unit. In an embodiment, the detected traffic parameters of one or more terminal signals comprise at least one of: the number of the terminal signals, the level of the terminal signals, interference and noise.

In an embodiment, the averaging units 302 of each remote unit are configured to average an rms antenna input level of the remote units on the basis of the detected traffic parameters of the terminal signals. After averaging the remote units send signals related to the detected traffic parameters to the base station 142. The signals related to the detected traffic parameters may comprise, for example, rms antenna input levels of each remote unit.

In an embodiment, the base station is then configured to calculate the relative average traffic levels between the remote units by calculating an average age value of traffic through each remote unit. The base station may also be configured to calculate a peak value of the traffic through each of the remote units.

In an embodiment, the base station is configured to allocate traffic transfer resources in the radio system by sharing the traffic transfer resources between the remote units as evenly as possible on the basis of the calculated relative average traffic levels between the remote units. The traffic transfer resources in the radio system may also be allocated by splitting one or more cells in such a way that the total average traffic levels of the remote units in each cell are as equal as possible when it is detected that more capacity is needed in the radio system.

The traffic controlling and/or monitoring may not have to be on all the time. It is possible to set the traffic controlling on, for example, only for the busiest hours of the given days. Each remote unit may have a detector or any equivalent unit that will provide rms signal proportional to the antenna input level of the remote unit. This detector may be located in any part of the communication chain where the signals from different remote units are not yet combined. The location of the detector can thus be, for example, before the summing of the signals from different remote units. The rms antenna input level of each remote unit may be proportional to the number and level of the terminal signals within the coverage area of the same remote unit including all interference and noise. The remote units may report the signals together with remote unit identification to the base station, for example, one value in every 10 seconds.

The base station receives the signals from each remote unit when the traffic-monitoring feature is on. From the data of the signals the base station may then calculate total and peak values that are proportional to the peak and average traffic through the remote units.

Figure 4:
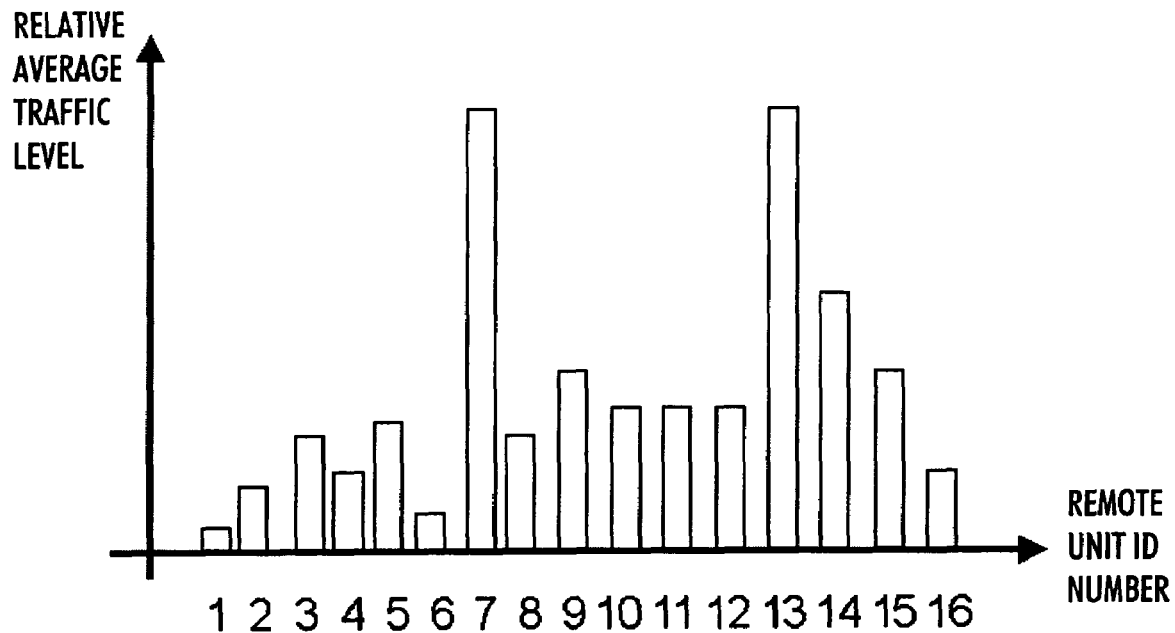
FIG. 4 illustrates examples of relative average traffic levels of remote units of a radio system.

FIG. 4 illustrates examples of relative average traffic levels of remote units within a cell of a radio system. The X-axis shows the identification numbers of the remote units and the Y-axis illustrates the relative average traffic levels of the remote units. In an embodiment, a radio network controller and network management subsystem know the total traffic of each cell and also the information whether more capacity is needed in the radio system is received from there. For example, let us assume a case where new capacity is required in the radio system and thus, a cell is to be divided for increasing capacity. Looking at the exemplary values of FIG. 4, it can be seen that the division of the cell must be carried out such that the remote unit 7 and the remote unit 13 are in different cells after the division. Thus, the traffic load is shared more evenly between the new cells.

Figure 5:
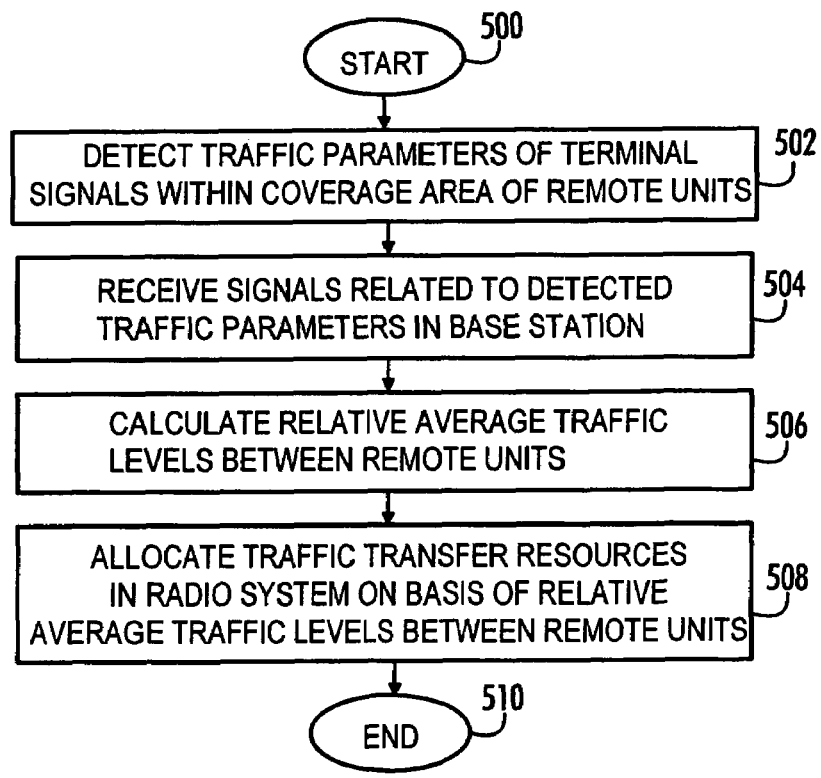
FIG. 5 illustrates an example of a method of controlling traffic in a radio system.

FIG. 5 illustrates an example of a method of controlling traffic in a radio system. The method starts in 500. In 502, traffic parameters of one or more terminal signals within the coverage area of each remote unit are detected in the remote units. Each remote unit may then average the received traffic parameters of the terminal signals to form an rms antenna input level that is proportional to the number and level of the terminal signals within the coverage area of that remote unit including all interference and noise.

In 504, signals related to the detected traffic parameters from the remote units are received in the base station. The signals may thus include the rms antenna input levels that were averaged in the remote units. In 506, relative average traffic levels between the remote units on the basis of the received signals related to the traffic parameters from the remote units are calculated in the base station. In 508, traffic transfer resources in the radio system are allocated on the basis of the calculated relative average traffic levels between the remote units. The traffic transfer resources may thus remain allocated as they are until it is detected that there becomes a need for reallocation of the traffic transfer resources on the basis of the regularly calculated relative average traffic levels between the remote units. The method ends in 510.

Even though the invention is described above with reference to an example according to the accompanying drawings, it is clear that the invention is not restricted thereto but it can be modified in several ways within the scope of the appended claims.

The invention claimed is:

1. A method, comprising:
   receiving, in a base station, signals from at least one remote unit related to traffic parameters detected by the at least one remote unit, wherein the traffic parameters are traffic parameters of at least one terminal signal within a coverage area of each of a plurality of remote units, wherein the traffic parameters of the at least one terminal signal comprise at least one of a number of the terminal signals, interference and noise;
   calculating, by the base station, relative average traffic levels between the remote units based on the received signals related to the traffic parameters from the remote units; and
   allocating traffic transfer resources based on the calculated relative average traffic levels between the remote units, wherein
   the allocating of the traffic transfer resources further comprises either sharing the traffic transfer resources between the remote units evenly or splitting at least one cell so that total average traffic levels of the remote units in each cell are as equal as possible when it is detected that more capacity is needed.

2. The method of claim 1, wherein the detected traffic parameters of the terminal signals comprise a level of the terminal signals.

3. The method of claim 1, the method further comprising: averaging, by one or more of the at least one remote units, a root mean square antenna input level of the averaging remote unit based on the detected traffic parameters of the at least one terminal signals.

4. The method of claim 3, wherein the received signals related to the traffic parameters comprise root mean square antenna input levels of each remote unit.

5. The method of claim 1, wherein the calculating of the relative average traffic levels between the remote units comprises calculating a peak value of traffic through each remote unit.

6. The method of claim 1, wherein the calculating of the relative average traffic levels between the remote units comprises calculating an average value of traffic through each remote unit.

7. A system, comprising:
at least one remote unit in each cell of a plurality of coverage areas controlled by a base station, the at least one remote unit communicating with at least one terminal of the system, wherein
the at least one remote unit is configured to detect traffic parameters of at least one terminal signal within the corresponding cell coverage area, wherein the traffic parameters of the at least one terminal signal comprise at least one of a number of terminal signals, interference and noise,
the base station is configured to receive signals related to the detected traffic parameters from at least one remote unit, to calculate relative average traffic levels between the at least one remote unit in each cell coverage area based on the received signals related to the traffic parameters from at least one remote unit, and to allocate traffic transfer resources in the system based on the calculated relative average traffic levels between the remote units, and
the base station is configured to allocate the traffic transfer resources in the system either by sharing the traffic transfer resources between the remote units evenly or by splitting at least one cell so that total average traffic levels of the remote units in each cell are as equal as possible when it is detected that more capacity is needed.

8. The system of claim 7, wherein the detected traffic parameters of the terminal signals comprise a level of the terminal signals.

9. The system of claim 7, wherein the at least one of the remote units is configured to average a respective root mean square antenna input level based on detected traffic parameters of the at least one terminal signal.

10. The system of claim 9, wherein the received signals related to the detected traffic parameters comprise root mean square antenna input levels of each remote unit.

11. The system of claim 7, wherein the base station is configured to calculate the relative average traffic levels between the at least one remote unit in each cell coverage area by calculating a peak value of traffic through each remote unit.

12. The system of claim 7, wherein the base station is configured to calculate the relative average traffic levels between the at least one remote unit in each cell coverage area by calculating an average value of traffic through each remote unit.

13. An apparatus, comprising:
a processor configured to
detect traffic parameters of at least one terminal signal within a coverage area of each of a plurality of remote units, wherein the traffic parameters of the at least one terminal signal comprise at least one of a number of the terminal signals, interference and noise, and
initiate sending of a signal related to the detected traffic parameters to a base station to enable the base station to calculate relative average traffic levels between a plurality of remote units within a cell coverage area of the base station based on the signals related to the traffic parameters sent by the remote units, and to enable the base station to allocate traffic transfer resources based on the calculated relative average traffic levels between the remote units, wherein
the allocation of the traffic transfer resources by the base station further comprises either sharing the traffic transfer resources between the remote units evenly or splitting at least one cell so that total average traffic levels of the remote units in each cell are as equal as possible when it is detected that more capacity is needed.

14. The apparatus of claim 13, wherein the detected traffic parameters of the terminal signals comprise a level of the terminal signals.

15. The apparatus of claim 13, wherein the processor is further configured to average a root mean square antenna input level of the apparatus based on the traffic parameters of the at least one terminal signal.

16. The apparatus of claim 13, wherein the signals related to the detected traffic parameters sent to the base station comprise root mean square antenna input levels of each of the plurality of remote units.

17. An apparatus, comprising:
a processor configured to
receive, from at least one remote unit, signals related to traffic parameters of at least one terminal signal within a coverage area of the at least one remote unit, wherein the traffic parameters of the at least one terminal signal comprise at least one of a number of the terminal signals, interference and noise,
calculate relative average traffic levels between the at least one remote unit in each of a plurality of cell coverage areas based on the received signals related to the traffic parameters from the at least one remote unit, and
allocate traffic transfer resources based on the calculated relative average traffic levels between the remote units, wherein
the processor is further configured to either allocate the traffic transfer resources by sharing the traffic transfer resources between the remote units evenly or by splitting at least one cell so that total average traffic levels of the at least one remote unit in each cell are as equal as possible when it is detected that more capacity is needed.

18. The apparatus of claim 17, wherein the signals related to the detected traffic parameters comprise root mean square antenna input levels of each remote unit.

19. The apparatus of claim 17, wherein the processor is further configured to calculate the relative average traffic levels between the at least one remote unit in each cell coverage area by calculating a peak value of traffic through each remote station.

20. The apparatus of claim 17, wherein the processor is further configured to calculate the relative average traffic levels between the at least one remote unit in each cell coverage area by calculating an average value of traffic through each remote unit.

21. An apparatus, comprising:
receiving means for receiving signals related to the detected traffic parameters from at least one remote unit in each cell coverage area;
calculation means for calculating relative average traffic levels between the at least one remote unit in each cell coverage area based on the received signals related to the traffic parameters from the at least one remote unit in each cell coverage area; and
allocation means for allocating traffic transfer resources in the system based on the calculated relative average traffic levels between the remote units, wherein
the allocating means is further configured to either allocate the traffic transfer resources by sharing the traffic transfer resources between the remote units evenly or by splitting at least one cell so that total average traffic levels of the at least one remote unit in each cell are as equal as possible when it is detected that more capacity is needed.

22. A method, comprising:
detecting traffic parameters of at least one terminal signal within a coverage area of a remote unit, wherein the traffic parameters of the at least one terminal signal comprise at least one of a number of the terminal signals, interference and noise; and
initiating sending of traffic parameters to a base station to enable the base station to calculate relative average traffic levels between a plurality of remote units within a coverage area of the base station based on the sent traffic parameters, and to enable the base station to allocate traffic transfer resources based the calculated relative average traffic levels between the remote units, wherein
the allocation of the traffic transfer resources by the base station further comprises either sharing the traffic transfer resources between the remote units evenly or splitting at least one cell so that total average traffic levels of the remote units in each cell are as equal as possible when it is detected that more capacity is needed.

23. The method of claim 22, wherein the detected traffic parameters of the terminal signals comprise a level of the terminal signals.

24. The method of claim 22, further comprising:
averaging a root mean square antenna input level based on the traffic parameters of the at least one terminal signal.

25. The method of claim 22, wherein the signals related to the detected traffic parameters sent to the base station comprise root mean square antenna input levels of each of the plurality of remote units.

26. An apparatus, comprising:
detection means for detecting traffic parameters of at least one terminal signal within a coverage area of a remote unit, wherein the traffic parameters of the at least one terminal signal comprise at least one of a number of the terminal signals, interference and noise; and
transmission means for initiating sending of traffic parameters to a base station to enable the base station to calculate relative average traffic levels between a plurality of remote unit within a coverage area of the base station based on the sent traffic parameters, and to enable the base station to allocate traffic transfer resources based on the calculated relative average traffic levels between the remote units, wherein
the allocation of the traffic transfer resources by the base station further comprises either sharing the traffic transfer resources between the remote units evenly or splitting at least one cell so that total average traffic levels of the remote units in each cell are as equal as possible when it is detected that more capacity is needed.

* * * * *